Patented May 6, 1924.

1,493,455

UNITED STATES PATENT OFFICE.

VALERIUS KOBELT, OF MUNICH, GERMANY.

PROCESS OF MAKING A BASE-EXCHANGING COMPOUND.

No Drawing.    Application filed October 4, 1923. Serial No. 666,632.

*To all whom it may concern:*

Be it known that I, VALERIUS KOBELT, a citizen of Germany, residing at Munich, Germany, have invented certain new and useful Improvements in a Process of Making a Base-Exchanging Compound, of which the following is a specification.

It is well known that natural and artificial base exchanging substances, after a chemical or physical treatment, may be used for removing iron and manganese and also calcium and magnesium compounds from water, see British Patent 3057 of 1912 and the German Patent 197,111.

In the German Patent 197,111 it is pointed out that there are base exchanging substances, such as aluminium double silicates, which cannot be used for purifying water on account of their poor exchanging properties and because they give off bases soluble in water. The present invention relates in general to a process for rendering these aluminium silicates capable of exchanging bases so as to produce thereby a useful water-purifying agent.

I have found that burnt clay or bricks, when broken up into fragments and treated with acid, constitutes a useful water-softening agent. A substance such as bricks burnt at a comparatively low temperature, which has only very poor base exchanging properties, may be converted into an effective base exchanging agent by a short treatment with concentrated hydrochloric acid and this agent may be used for the softening of drinking and other water. A specific example of a method of this kind for producing a water-softening agent is the following:

50 grams of brick (yellow) burnt at a temperature of 600° C. are broken into fragments or grains of a size of 1–1½ mms. or less and then treated for about two minutes with hydrochloric acid of a concentration of about 30%. The brick grains are then washed free from acid, the neutral condition being tested for example with litmus. The base exchanging properties for lime and magnesia (CaO and MgO) of the material obtained in this manner will be found to be as much as 0.17%.

The investigations described hereinafter prove that the treatment with a concentrated solution of hydrochloric acid does not merely produce a temporary effect, but that the effect is permanent.

630 grams of the substance obtained in the above described manner were placed in a glass tube 5 cms. in diameter and 10 liters of water of 10.8 German degrees of hardness were filtered through the substance at a speed of flow of three meters per hour. The hardness of the water was thereby reduced to 0°. Consequently 630 grams of the water-softening substance absorbed 1.08 grams of calcium oxide and magnesia, which corresponds to an exchanging coefficient of 0.17%.

After filtration the material was regenerated with a 10% solution of sodium chloride. The material which was then used and regenerated again and again always gave the same results, i. e., softening of the water to 0°, which was proved by 10 tests.

I have found that an efficient base exchanging agent may also be obtained by treating burnt clay such as granulated brick with dilute acid if the acid treatment is followed by a treatment with basic salts. This method of producing a base exchanging agent is exemplified as follows:

100 grams of granulated brick with grains of a size of 1–1½ mms. are digested in 50 ccms. of 1% hydrochloric acid for about 15–20 minutes at a boiling temperature. The substance is then washed with ordinary water until it is neutralized, whereby the basic salts soluble in water or acid are removed. The brick which has been treated in this manner is then boiled for about 3–4 hours with a solution of NaOH corresponding to 1% sodium oxide or 2% sodium carbonate. The amount of caustic soda or sodium carbonate solution used for the 100 grams of granulated brick is 75–100 ccms. The material treated in this manner in then washed with water until a test with phenolphtalein shows that the alkaline liquor used has been completely removed. 100 grams of granulated brick treated in this manner will take up about 200 milligrams of calcium oxide and magnesia as a result of its base exchanging properties. The material treated in this manner will no longer give off free alkalies and its exchanging properties are quite sufficient to enable it to be employed in a commercial water-purifying plant. The process may be briefly described as follows:

Burnt clay broken into sufficiently fine grains is treated with acidulated water until the wash water that flows off no longer shows any free alkalies and this treatment is followed by a treatment with caustic alkali or alkali metal carbonate solution. Instead of using alkali metal carbonate solutions other alkaline solutions of salts may be used such as ammoniacal chloride of calcium solution. An example of a treatment with ammoniacal chloride of calcium solution is the following:

50 grams of clay burnt at a temperature of 600° and broken into grains of a size of 1-1½ mm. are washed by 50 ccms. of concentrated hydrochloric acid (about 30%). The granulated brick is then washed until neutral. Thereupon the material is boiled in a 5-10% ammoniacal chloride of calcium solution for ½-1 hour. This is followed by washing the material until no ammonia is present in the washing water.

Instead of boiling in ammoniacal solution the same result can be obtained if the granulated substance which has been treated with hydrochloric acid, is allowed to stand for about 48 hours in the ammoniacal chloride of calcium solution. The material obtained in this manner has an exchangeability of about 0.2% for lime and magnesia ($CaO+MgO$).

As already pointed out, the preferable form of burnt clay consists of lightly burnt brick, i. e., clay burnt at a temperature of about 600°.

I claim:—

1. Process for producing a water-purifying agent of the kind described consisting in treating a burnt clay material of poor base exchanging properties with acid.

2. Process for producing a water purifying agent consisting in treating granulated burnt clay with acid.

3. Process for producing a water purifying agent consisting in treating a base exchanging substance comprising burnt clay material with a solution of hydrochloric acid.

4. Process for producing a water purifying agent consisting in treating burnt clay with acidulated water to remove the bases soluble in acid, and in thereupon treating the said substances with an alkaline material.

5. Process for producing a water purifying agent consisting in treating base exchanging substances consisting essentially of granular burnt clay, with acidulated water to remove the bases soluble in acid and in thereafter treating the said substances with a solution of alkali.

6. Process for producing a water purifying agent consisting in burning clay at a temperature of 600° C., breaking the clay into granules of a size of about 1 to 1½ mms., digesting the granulated material in an acid solution, washing the digested material until it is neutralized, and then boiling the granulated material in an alkaline solution.

7. Process for producing a water purifying agent consisting in burning clay at a temperature of about 600° C., breaking the clay into fragments of a size of about 1-1½ mms., digesting the granulated material in a 1% solution of hydrochloric acid for about 15-20 minutes at a boiling temperature, washing the digested material until it is neutralized, and boiling the neutralized material in a 1% caustic soda solution for 3-4 hours.

In testimony whereof I affix my signature in presence of two witnesses.

VALERIUS KOBELT.

Witnesses:
 PAUL DREY,
 DIDE SOTO.